United States Patent
Tsuchiya (10) Patent No.: US 9,071,173 B2
(45) Date of Patent: Jun. 30, 2015

(54) MOTOR CONTROL DEVICE, AND OPTICAL SCANNING DEVICE, IMAGE FORMING DEVICE AND PRINTED CIRCUIT BOARD INCLUDING THE SAME

(75) Inventor: Toshikazu Tsuchiya, Susono (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/238,163

(22) PCT Filed: Sep. 11, 2012

(86) PCT No.: PCT/JP2012/073769
§ 371 (c)(1),
(2), (4) Date: Feb. 10, 2014

(87) PCT Pub. No.: WO2013/058045
PCT Pub. Date: Apr. 25, 2013

(65) Prior Publication Data
US 2014/0204431 A1    Jul. 24, 2014

(30) Foreign Application Priority Data

Oct. 20, 2011  (JP) .................... 2011-231094
Aug. 1, 2012   (JP) .................... 2012-171496

(51) Int. Cl.
| H04N 1/04 | (2006.01) |
|---|---|
| H02P 6/00 | (2006.01) |
| H02P 6/12 | (2006.01) |
| H02P 6/16 | (2006.01) |
| H02P 6/20 | (2006.01) |
| G02B 26/12 | (2006.01) |
| H04N 1/113 | (2006.01) |
| G03G 15/043 | (2006.01) |

(52) U.S. Cl.
CPC ...... *H02P 6/003* (2013.01); *H02P 6/12* (2013.01); *H02P 6/16* (2013.01); *H02P 6/205* (2013.01); *G02B 26/122* (2013.01); *H04N 1/113* (2013.01); *G03G 15/043* (2013.01)

(58) Field of Classification Search
CPC .......... H04N 1/113; H02P 6/003; H02P 6/12; H02P 6/16; H02P 6/205
USPC .................... 358/474, 498, 497, 496
See application file for complete search history.

(56) References Cited

U.S. PATENT DOCUMENTS

| 8,477,170 B2 | 7/2013 | Tsuchiya ................ 347/237 |
| 2004/0080293 A1 | 4/2004 | Kurosawa et al. .......... 318/459 |
| 2011/0243590 A1* | 10/2011 | Ito .................................. 399/51 |

FOREIGN PATENT DOCUMENTS

| JP | 2006-289746 | 10/2006 |
| JP | 2007-062266 | 3/2007 |
| JP | 3993502 | 10/2007 |

OTHER PUBLICATIONS

International Search Report dated Nov. 13, 2013, in counterpart PCT Patent Application No. PCT/JP2012/073769.

*Primary Examiner* — Houshang Safaipour
(74) *Attorney, Agent, or Firm* — Fitzpatrick, Cella, Harper & Scinto (57) ABSTRACT

A CPU determines that a motor is undergoing a forward rotation when a time difference between a detection timing of a light beam deflected by a rotating polygonal mirror and an output timing of a detection signal from a magnetic detector element falls within a predetermined range, and that the motor is undergoing a reverse rotation when the time difference does not fall within the predetermined range. With this configuration, a detection circuit for detecting voltage induced in three phases is unnecessary, and therefore the cost can be reduced. Furthermore, there is no need to detect voltage induced in each of the three phases. As it suffices to simply detect the time difference, the amount of time required to detect a rotation direction can be reduced.

15 Claims, 9 Drawing Sheets

MOTOR CONTROL DEVICE, AND OPTICAL SCANNING DEVICE, IMAGE FORMING DEVICE AND PRINTED CIRCUIT BOARD INCLUDING THE SAME

TECHNICAL FIELD

The present invention relates to a motor control device and to an optical scanning device, an image forming device and a printed circuit board including the same.

BACKGROUND ART

Electrophotographic image forming devices form latent images on an image carrier by scanning the image carrier using laser light deflected by a rotating polygonal mirror. This rotating polygonal mirror is driven by a motor that rotates constantly in one direction. Conventionally, three Hall elements have been required to detect the rotation direction of the motor. Decreasing the number of the Hall elements to one can reduce the manufacturing cost, but increases the amount of time necessary for detecting a reverse rotation.

In view of the above, Japanese Patent No. 3993502 proposes the invention whereby, when a small current flows through any two phases of three phases, a polarity of voltage induced in the remaining one phase is detected. When the detection results of the two phases out of the detection results of the three phases match the expected results, a rotor is rotated in disregard of the detection result of the remaining one phase.

However, the invention of Japanese Patent No. 3993502 is problematic not only in that a detection circuit that detects voltage induced in the three phases is costly, but also in that the detection takes time.

SUMMARY OF INVENTION

In view of the above, the feature of the present invention is to provide a motor control device that can reduce the cost and the amount of time necessary for detecting the rotation direction.

The present invention provides a motor control device comprising: a motor that drives a rotating polygonal mirror for deflecting light output from a light source; a first detector element that detects the light deflected by the rotating polygonal mirror and outputs a first detection signal; a second detector element that outputs a second detection signal when the motor rotates; and a rotation direction determination unit that determines that the motor is undergoing a forward/regular rotation when a time difference between an output timing of the first detection signal and an output timing of the second detection signal falls within a predetermined range, and that the motor is undergoing a reverse/counter rotation when the time difference does not fall within the predetermined range.

The present invention further provides an optical scanning device comprising: a light source; a rotating polygonal mirror that deflects light output from the light source; a motor that drives the rotating polygonal mirror; a first detector element that detects the light deflected by the rotating polygonal mirror and outputs a first detection signal; a second detector element that outputs a second detection signal when the motor rotates; and a rotation direction determination unit that determines that the motor is undergoing a forward rotation when a time difference between an output timing of the first detection signal and an output timing of the second detection signal falls within a predetermined range, and that the motor is undergoing a reverse rotation when the time difference does not fall within the predetermined range.

The present invention further provides an image forming device comprising: an image carrier; and an optical scanning device that forms a latent image by irradiating the image carrier with light, wherein the optical scanning device includes: a light source; a rotating polygonal mirror that deflects light output from the light source; a motor that drives the rotating polygonal mirror; a first detector element that detects the light deflected by the rotating polygonal mirror and outputs a first detection signal; a second detector element that outputs a second detection signal when the motor rotates; and a rotation direction determination unit that determines that the motor is undergoing a forward rotation when a time difference between an output timing of the first detection signal and an output timing of the second detection signal falls within a predetermined range, and that the motor is undergoing a reverse rotation when the time difference does not fall within the predetermined range.

The present invention further provides a motor control device in which a motor drive circuit that drives a motor and a detector element that detects a rotation direction of the motor are encapsulated in the same semiconductor integrated unit.

The present invention further provides a printed circuit board comprising: a motor; a detector element that detects a rotation direction of the motor; and a semiconductor integrated unit that controls driving of the motor in accordance with a signal from the detector element, wherein the semiconductor integrated unit is mounted obliquely with respect to the printed circuit board so that a distance from a center of a rotation shaft of the motor to the detector element is maintained at a predetermined distance.

Further features of the present invention will become apparent from the following description of exemplary embodiments (with reference to the attached drawings).

DESCRIPTION OF EMBODIMENTS

The following describes embodiments of the present invention with reference to the attached drawings. It should be noted that the following embodiments do not limit the invention of the attached claims, and not all combinations of the features explained in the embodiments are indispensable for the configuration of the invention.

Embodiment 1

Figure 1:
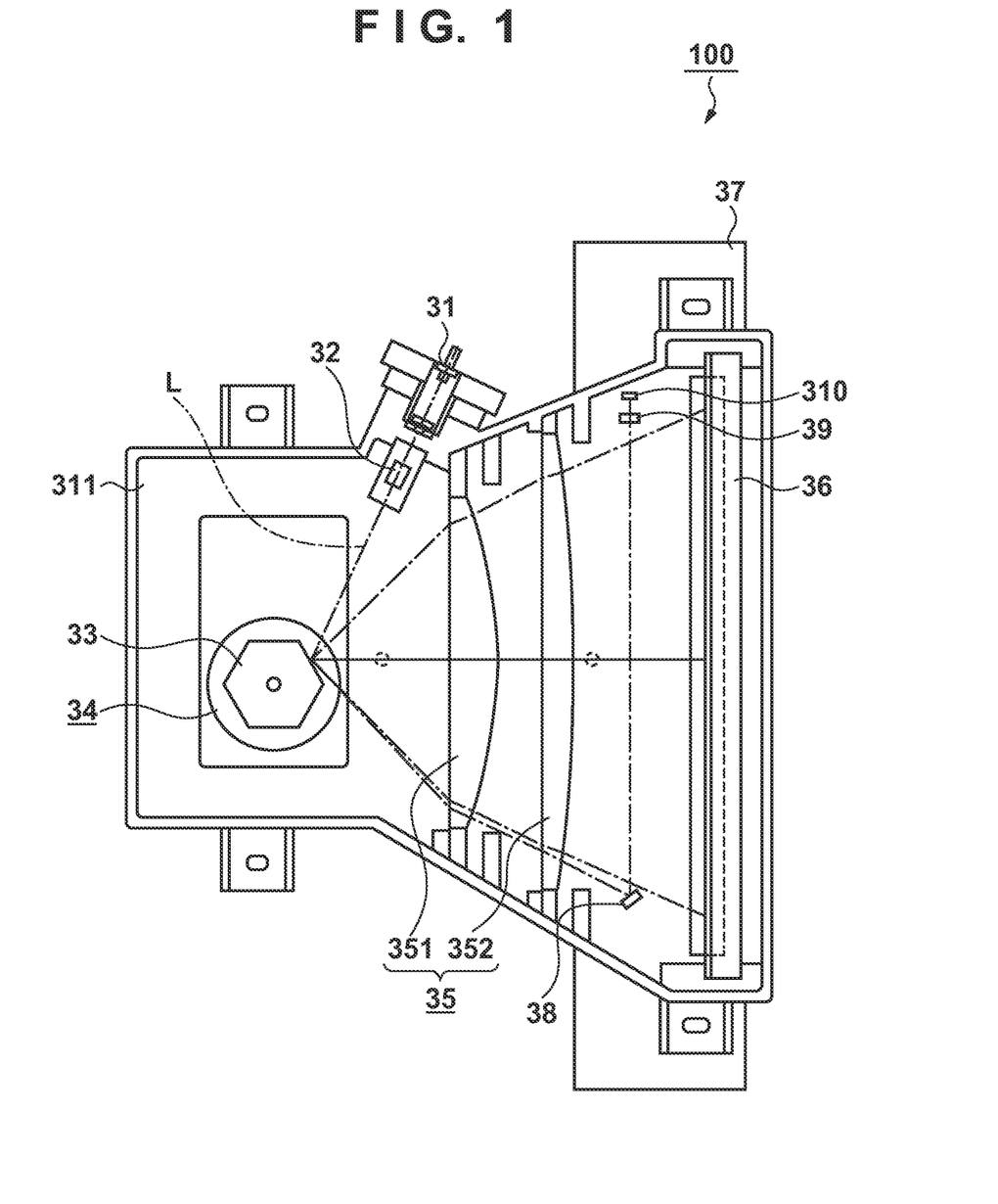
FIG. 1 is a plan view showing an outline of an optical scanning device.

FIG. 1 shows a general optical scanning device 100 used in an electrophotographic image forming device. The optical scanning device 100 forms a latent image by irradiating an image carrier with light. A semiconductor laser unit 31 generates a laser beam L. After passing through a cylindrical lens 32, the laser beam L is deflected by a reflective surface of a rotating polygonal mirror 33. The rotating polygonal mirror 33 is driven by a deflection scanning device 34. The deflection scanning device 34 is constituted by a three-phase brushless motor. The deflection scanning device 34 may be called a scanner motor as it scans the image carrier using a deflected light beam. As such, the deflection scanning device 34 is one example of a motor that drives a rotating polygonal mirror for deflecting a light beam output from a light source. The laser beam L deflected by the rotating polygonal mirror 33 passes through Fθ lenses 35 and is deflected by a fold mirror 36. The Fθ lenses 35 are composed of a first lens 351 and a second lens 352. The first lens 351 is either a spherical lens or a toric lens. The second lens 352 is a toric lens. The deflected laser beam L scans a surface of a photosensitive drum 37. The surface of the photosensitive drum 37 includes an effective image area in which an image is formed, and a non-image area which is positioned outside of the effective image area and in which an image is not formed. A signal detection mirror 38 that reflects a part of the laser beam L is arranged on an optical path toward the non-image area. A focus lens 39 and a signal detection sensor 310 are arranged on an optical path along the direction of reflection of the signal detection mirror 38. The signal detection sensor 310 outputs a horizontal synchronization signal (BD signal) each time the laser beam L is incident thereon. As such, the signal detection sensor 310 is one example of a light detector element that detects a light beam deflected by the rotating polygonal mirror 33 and outputs a first detection signal. An optical unit 311 accommodates the above optical members.

Figure 2:
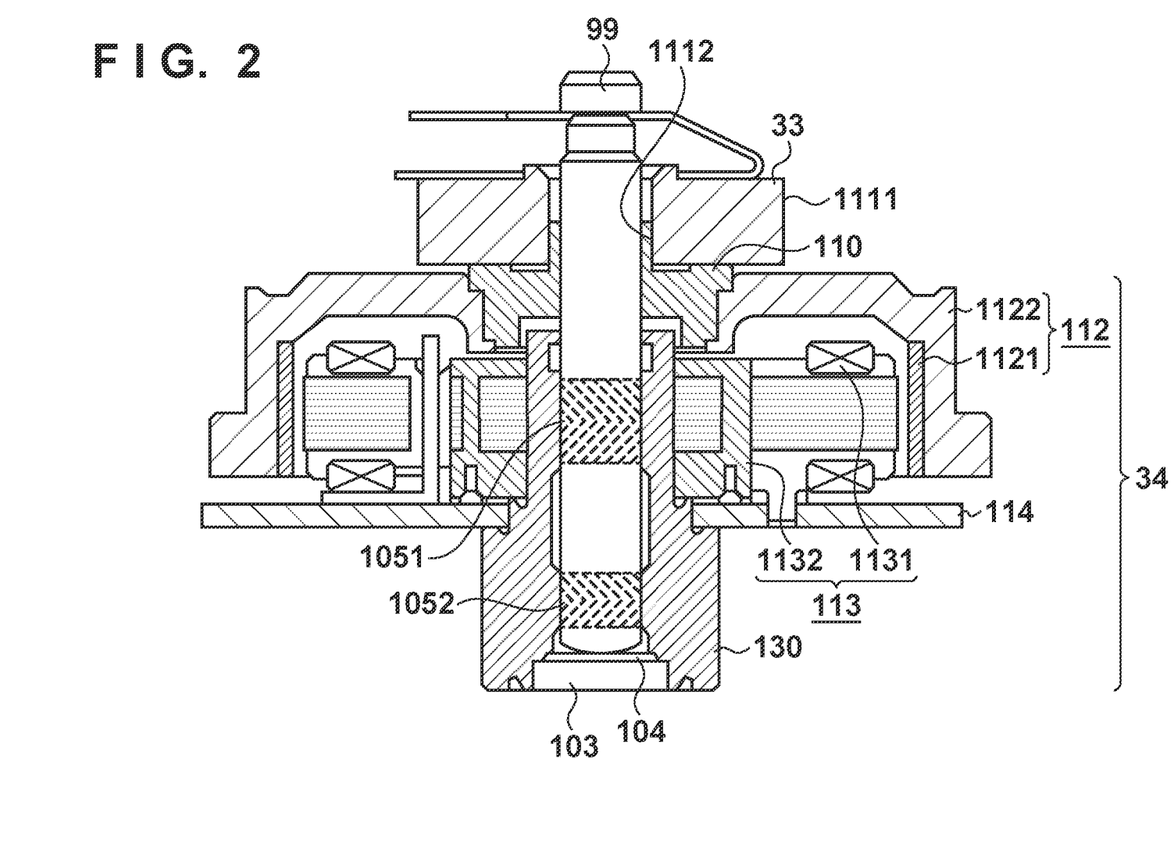
FIG. 2 is a cross-sectional view showing an outline of a deflection scanning device.

FIG. 2 is a cross-sectional view showing an outline of the deflection scanning device 34. When the deflection scanning device 34 uses a dynamic pressure bearing as a bearing member for supporting the rotating polygonal mirror 33 that rotates at high speed, stable and smooth rotation can be ensured. A sleeve 130 supports a shaft 99 such that the shaft 99 is rotatable in a bearing hole. A thrust cover 103 is fixed in place at the bottom of the sleeve 130 to close the bearing hole. A thrust plate 104 is supported by the thrust cover 103. A space between an inner surface of the bearing hole of the sleeve 130 and an outer surface of the shaft 99, as well as a space between the thrust plate 104 and an end surface of the shaft 99, are filled up with oil. The end surface of the shaft 99 and the thrust plate 104 together constitute a pivot thrust bearing. Dynamic pressure generating grooves 1051 and 1052 have a herringbone pattern. When the shaft 99 rotates in a forward direction, the oil is collected around the dynamic pressure generating grooves 1051 and 1052 due to the rotation of the shaft 99, and therefore the shaft 99 is supported with high accuracy. A flange member 110 is fixed in place around the upper part of the shaft 99. The rotating polygonal mirror 33, which has a reflective surface 1111, is mounted on the flange member 110. The rotating polygonal mirror 33 is pressed against the flange member 110 by a holddown spring and is integrated with the flange member 110 and a rotor 112. Note that an inner diameter of a central hole 1112 of the rotating polygonal mirror 33 is larger than an outer diameter of the shaft 99 by approximately 0.05 mm, and the rotating polygonal mirror 33 is attached to the rotor 112 such that the shaft 99 fits freely inside the central hole 1112 of the rotating polygonal mirror 33.

The rotor 112, which is a major component of the deflection scanning device 34, includes a permanent magnet 1121 and a yoke 1122 that supports the permanent magnet 1121. A printed circuit board 114 is fixed to the sleeve 130. A stator core 1132 of a stator 113 is supported by the printed circuit board 114. Stator coils 1131 wound around the stator core 1132 face the permanent magnet 1121 of the rotor 112. The above components are the constituent elements of the deflection scanning device 34 that drives and rotates the rotating polygonal mirror 33.

Figure 3:
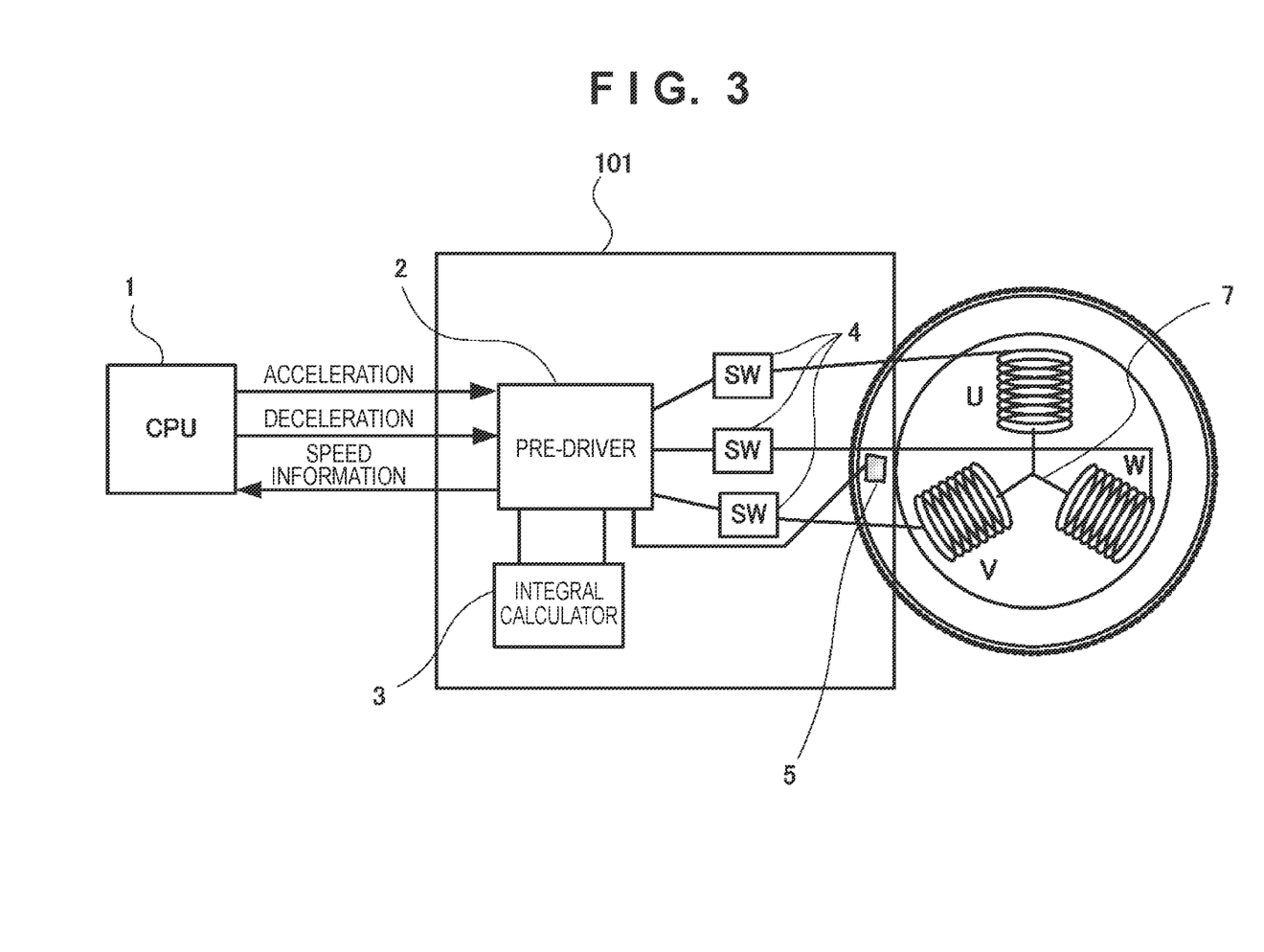
FIG. 3 shows a three-phase brushless motor according to Embodiments 1 to 3 and a group of control circuits therein.

FIG. 3 shows a configuration of the three-phase brushless motor. A central processing unit (CPU) 1 is a single-chip microcomputer. In order for the speed of the deflection scanning device 34 to match a pre-set target speed, the CPU 1 calculates a control amount from speed information and transmits control signals corresponding to the control amount, namely an acceleration signal and a deceleration signal, to a pre-driver 2. The pre-driver 2 outputs the acceleration signal and the deceleration signal transmitted from the CPU 1 to an integral calculator 3. The integral calculator 3 integrates the acceleration signal and the deceleration signal and returns the result of integration to the pre-driver 2. Note that the result of integration is equivalent to a torque instruction for the motor. A magnetic detector element 5 is, for example, a Hall element and generates a timing signal for causing a current to flow from the position of the permanent magnet of the motor to three-phase coils 7. As such, the magnetic detector element 5 is one example of a magnetic detector element that is provided to the motor and outputs a second detection signal when the motor rotates. Switches 4 are provided in one-to-one correspondence with the phases and turn on/off in accordance with the timing signal. The switches 4 are, for example, switching elements such as field-effect transistors (FETs). A drive control integrated circuit (IC) 101 is a drive control circuit for the three-phase brushless motor. The pre-driver 2, the switches 4, the integral calculator 3 and the magnetic detector element 5 are encapsulated in the drive control IC 101.

Figure 4:
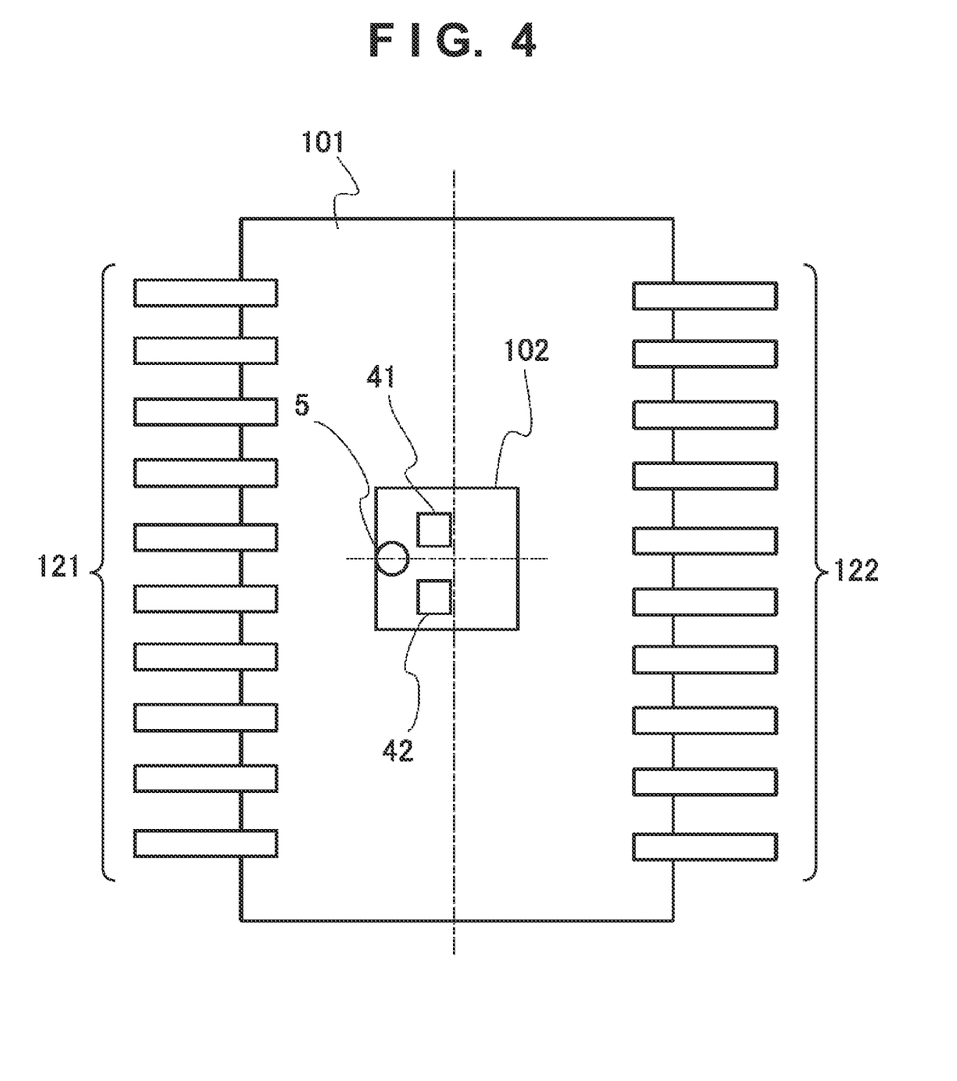
FIG. 4 shows a package of a semiconductor integrated circuit according to Embodiments 1 to 3.

FIG. 4 shows a package layout of the drive control IC 101. A drive control circuit semiconductor chip 102 includes the pre-driver 2, the switches 4, the integral calculator 3 and the magnetic detector element 5. That is to say, the drive control circuit semiconductor chip 102 is a semiconductor chip including a magnetic detector element and a motor drive circuit. The switches 4 are constituted by FET circuit blocks 41 and 42. A row of output pins 121 and a row of input pins 122 are connected to the drive control circuit semiconductor chip 102 by wire bonding. In this manner, the FET circuit blocks 41 and 42, which are included in the motor drive circuit that drives the motor, and the magnetic detector element 5 are encapsulated in the same semiconductor integrated circuit package.

As shown in FIG. 4, the row of output pins 121 are a group of output pins arranged on one side of the semiconductor chip, whereas the row of input pins 122 are a group of input pins arranged on the other side of the semiconductor chip. A vertical line and a horizontal line are drawn at the center of FIG. 4. The vertical line is parallel to the edges along which the row of output pins 121 and the row of input pins 122 are arranged out of the four edges of the semiconductor integrated circuit package, and passes through the center of the drive control circuit semiconductor chip 102. The horizontal line is parallel to the other two edges along which the row of output pins 121 and the row of input pins 122 are not arranged out of the four edges of the semiconductor integrated circuit package, and passes through the center of the drive control circuit semiconductor chip 102. That is to say, the vertical line and the horizontal line are perpendicular to each other. In particular, the magnetic detector element 5 and a group of circuits serving as major components of the motor drive circuit (the FET circuit blocks 41 and 42) are arranged in one of the two areas obtained by dividing the drive control circuit semiconductor chip 102 by the vertical line (the left area in FIG. 4). The magnetic detector element 5 is arranged on the horizontal line. By using this layout, the position of the magnetic detector element 5 can be easily determined, and the semiconductor chip can be easily downsized.

Figure 5A:
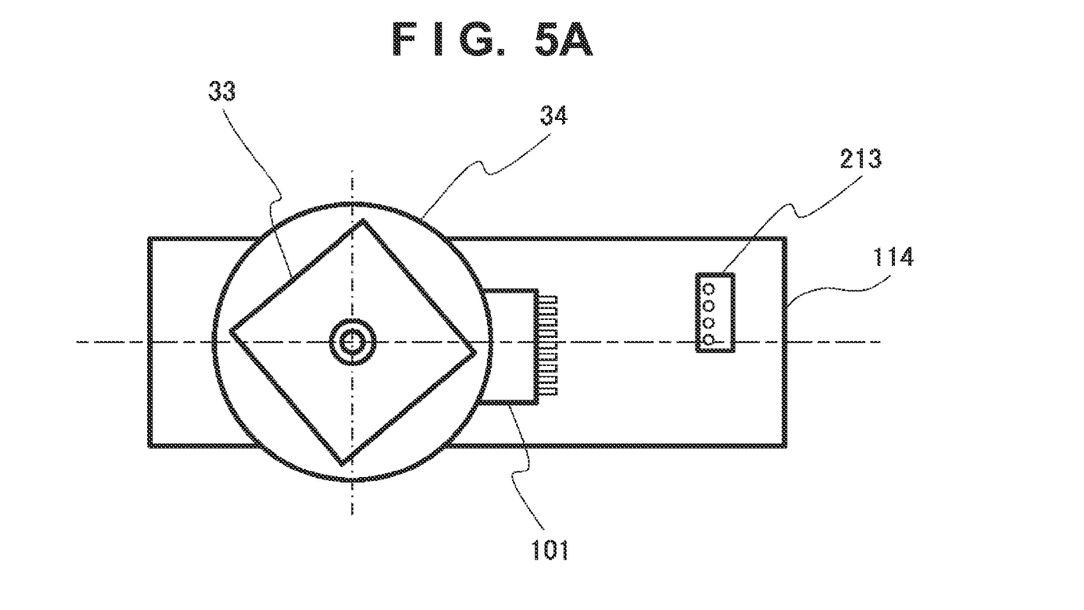
FIGS. 5A and 5B are layout diagrams showing a motor control device on a printed circuit board according to Embodiments 1 and 2.
Figure 5B:
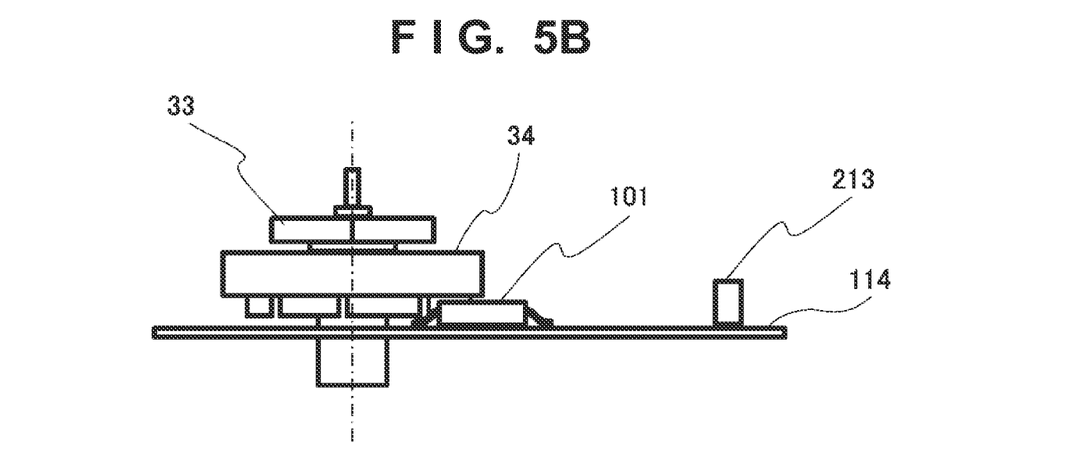

FIG. 5A is a front view of a motor unit including the rotating polygonal mirror 33 with four reflective surfaces. FIG. 5B is a side view of the motor unit. Copper foil patterns are formed on one side of the printed circuit board 114. Also, the semiconductor integrated circuit package and the motor are mounted on the printed circuit board 114. A connector 213 is for connecting to a cable extending from a control substrate on which the CPU 1 is mounted. Note, the control substrate is not shown in the figures. More specifically, the acceleration signal and the deceleration signal are input from the CPU 1 and the speed information indicating the rotation speed of the motor is output to the CPU 1 via the connector 213. The drive control IC 101 is arranged such that it is sandwiched between the permanent magnet 1121, which is positioned inside the outer circumference of the rotor 112 of the deflection scanning device 34, and the printed circuit board 114.

Figure 6:
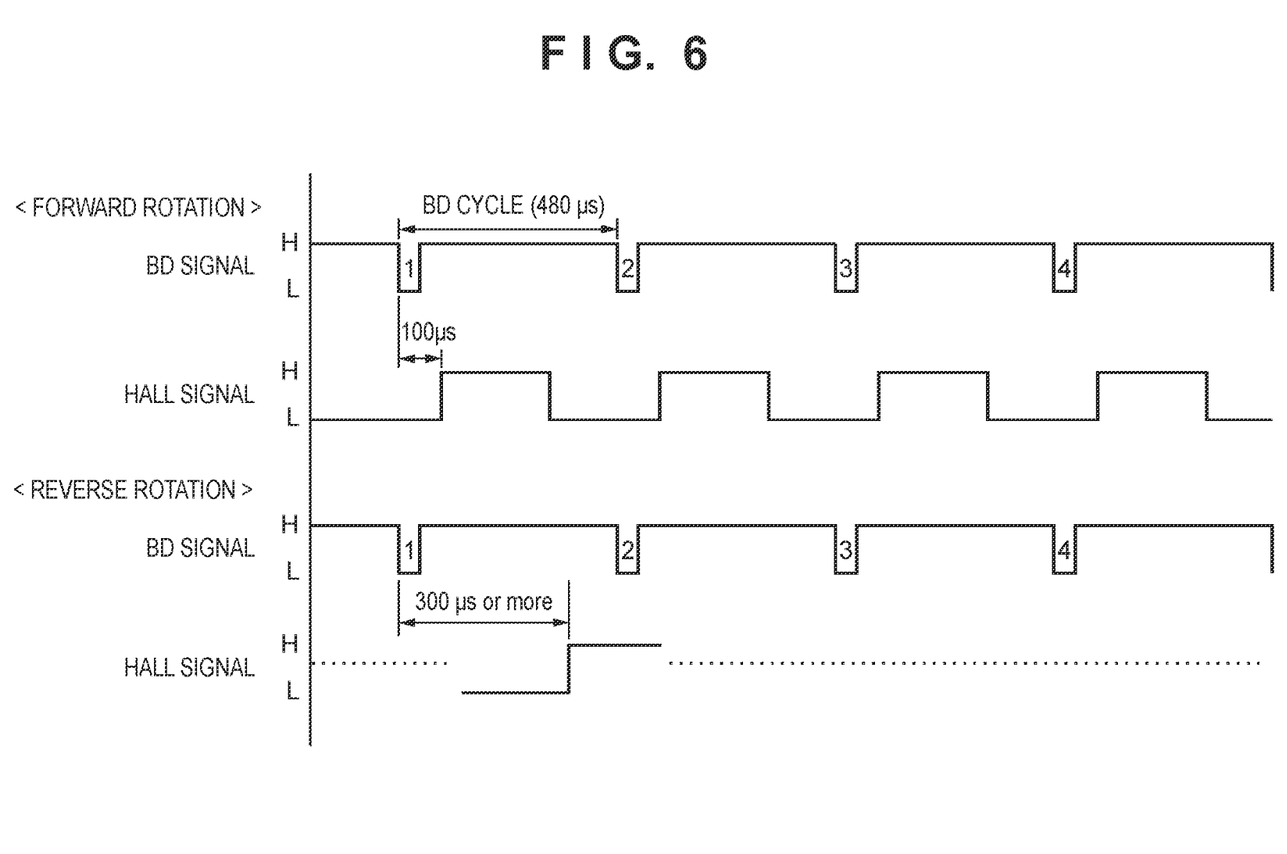
FIG. 6 is a timing chart for explaining a difference between a forward rotation and a reverse rotation in Embodiment 1.

FIG. 6 is a timing chart for explaining a difference between a forward rotation and a reverse rotation in the present embodiment. In FIG. 6, H denotes a high level and L denotes a low level. A falling edge of the BD signal is used as a reference timing for writing an image. A Hall signal is an analog differential signal output from the magnetic detector element 5. FIG. 6 shows waveforms obtained by binarizing the analog differential signal. In FIG. 6, <FORWARD ROTATION> shows a timing chart for the case where the motor is undergoing a normal rotation. On the other hand, <REVERSE ROTATION> shows a timing chart for the case where the motor is undergoing an abnormal rotation. In the case of <FORWARD ROTATION>, the Hall signal rises 100±5μ seconds after the BD signal falls (hereinafter, the second is abbreviated as s). On the other hand, in the case of <REVERSE ROTATION>, the Hall signal rises approximately 300 μs after the BD signal falls. The CPU 1 determines whether the motor is undergoing a forward rotation or a reverse rotation by detecting the above difference. As a rotation frequency cannot be identified in the case of reverse rotation, it is drawn as a dotted line in the timing chart of <REVERSE ROTATION>. The deflection scanning device 34 includes an oil bearing. Therefore, when the reverse rotation of the motor continues for a while, the oil is discharged from the dynamic pressure generating grooves 1051 and 1052 having a herringbone pattern. The discharged oil is leaked to the outside of the bearing. It is thus desirable to detect the rotation direction of the motor in a short amount of time so as to alleviate the oil leak.

Figure 7:
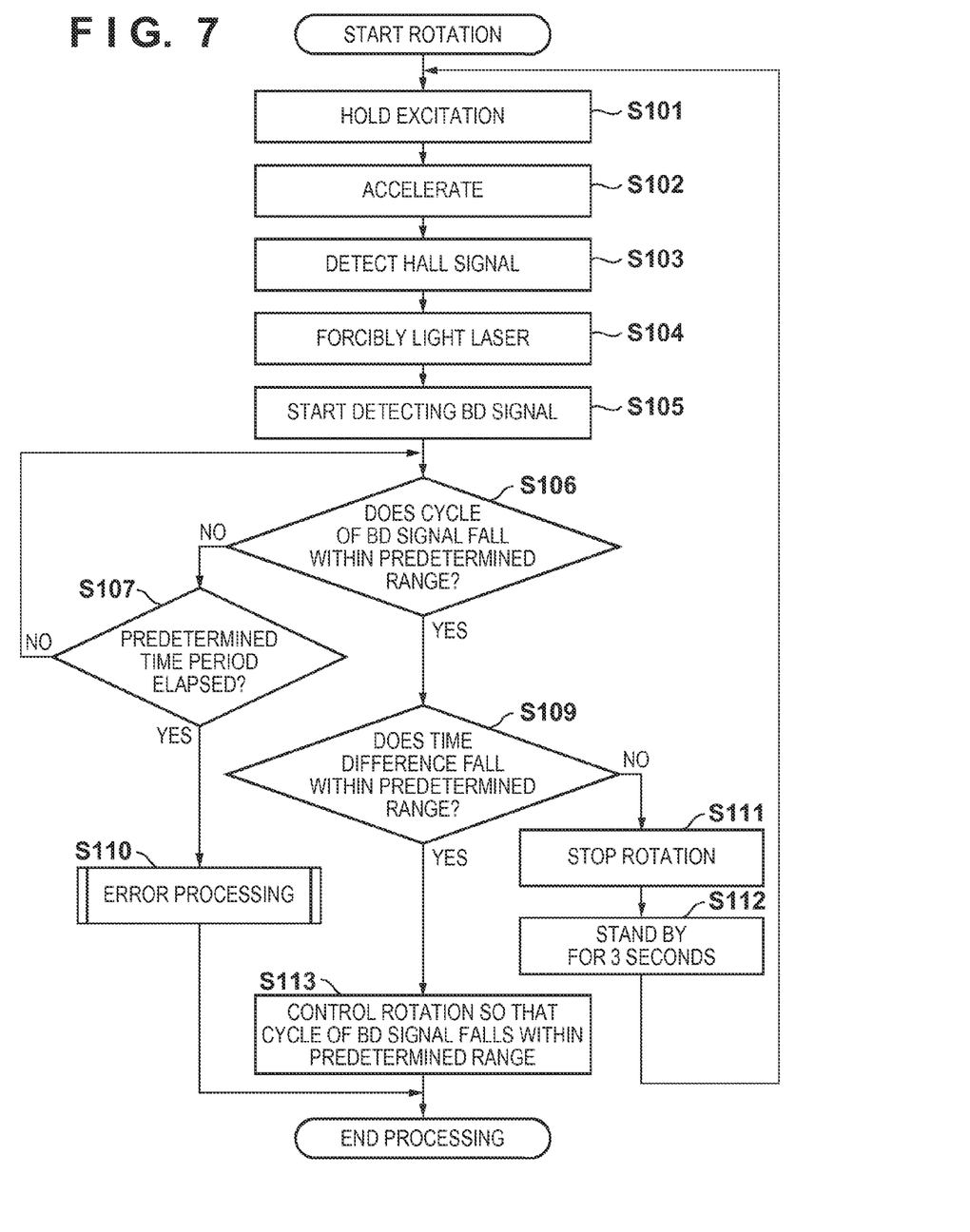
FIG. 7 is a flowchart of motor control processing according to Embodiment 1.

FIG. 7 is a flowchart of motor control according to Embodiment 1. As has been described above, the reverse rotation of the motor may cause undesirable results. In view of this, when the CPU 1 detects the reverse rotation of the motor, it stops the motor and then activates the motor again. At a timing for starting the rotation of the deflection scanning device 34, the CPU 1 places the acceleration signal at a low level. Note that in the present embodiment, the acceleration signal and the deceleration signal are active-low signals.

In S101, the CPU 1 holds the excitation for 50 ms by controlling the drive control IC 101 to switch between the switches 4 such that a current flows from the U phase to the V phase of the motor.

In S102, the drive control IC 101 starts accelerating the motor in accordance with the acceleration signal output from the CPU 1.

In S103, the CPU 1 starts detecting the Hall signal output from the magnetic detector element 5 via the drive control IC 101.

In S104, the CPU 1 forcibly lights the semiconductor laser unit 31.

In S105, the CPU 1 starts detecting the BD signal output from the signal detection sensor 310 via the drive control IC 101.

In S106, the CPU 1 measures a cycle of the BD signal and determines whether or not the cycle falls within a predetermined range (e.g. 480±5 μs). As such, the CPU 1 functions as a cycle determination circuit that monitors a cycle of a first detection signal and determines whether or not the cycle of the first detection signal falls within a predetermined range. When the cycle of the BD signal does not fall within the predetermined range, the processing moves to S107.

In S107, the CPU 1 determines whether or not a predetermined time period (e.g. 3 seconds) has elapsed since the detection of the BD signal was started. It is assumed here that a counter or a timer that counts time is built in the CPU 1. When the predetermined time period has elapsed since the detection of the BD signal was started, there is a possibility that some sort of abnormality has occurred. In this case, the processing moves to S110 where the CPU 1 executes error processing.

On the other hand, when the cycle of the BD signal falls within the predetermined range, the processing moves to S109. When the CPU 1 thus determines that the cycle of the first detection signal falls within the predetermined range, it starts determining the rotation direction of the motor.

In S109, the CPU 1 determines whether or not a time difference between the falling of the BD signal and the rising of the Hall signal falls within a predetermined range (e.g. 100±5 μs). When the time difference does not fall within the predetermined range, there is a high possibility of reverse rotation and therefore the processing moves to S111. As such, the CPU 1 functions as a rotation direction determination circuit that determines that the motor is undergoing a reverse rotation when a time difference between an output timing of the first detection signal and an output timing of the second detection signal does not fall within a predetermined range.

In S111, the drive control IC 101 temporarily stops the motor in accordance with a stop signal output from the CPU 1 to the drive control IC 101.

In S112, the CPU 1 stands by for a predetermined time period. That is to say, the CPU 1 waits for the rotation frequency of the motor to drop. Thereafter, the processing returns to S101 where the CPU 1 causes the drive control IC 101 to hold the excitation again. The succeeding operations have already been described above.

On the other hand, when the time difference falls within the predetermined range in S109, the CPU 1 determines that the motor is undergoing a forward rotation and the processing moves to S113. As such, the CPU 1 functions as a rotation direction determination circuit that determines that the motor is undergoing a forward rotation when a time difference between an output timing of the first detection signal and an output timing of the second detection signal falls within a predetermined range.

In S113, the CPU 1 monitors a cycle of the BD signal via the drive control IC 101 and outputs the acceleration signal and the deceleration signal so that the BD cycle falls within a predetermined range. The drive control IC 101 controls the rotation frequency of the motor in accordance with the acceleration signal and the deceleration signal.

As the present embodiment can control the motor using only one magnetic detector element 5, it can reduce the cost compared to conventional technologies that use three Hall elements. Furthermore, in the present embodiment, the CPU 1 can detect the rotation direction from a time difference between a timing of the BD signal and a timing of the Hall signal without using a detection circuit that detects voltage induced in three phases. It should be noted here that an element for detecting the BD signal and a magnetic detector element for outputting the Hall signal are normally indispensable for optical scanning devices and image forming devices. That is to say, the present embodiment can easily reduce the cost because the rotation direction can be detected only by calculation processing of the CPU 1 without adding elements. In addition, the detection circuit that detects voltage induced in the three phases causes a current to flow through two phases selected from among the three phases and detects voltage induced in the remaining one phase. This requires detection processing to be executed three times and therefore tends to increase the amount of time necessary for detection. In contrast, in the present embodiment, the CPU 1 can detect the rotation direction from a time difference between a timing of the BD signal and a timing of the Hall signal, and therefore the amount of time necessary for processing can be easily reduced. Moreover, the present embodiment encapsulates the pre-driver 2, the integral calculator 3, the switches 4 and the magnetic detector element 5 in the drive control IC 101 as one package, thus achieving both a size reduction and a cost reduction.

Embodiment 2

The feature of Embodiment 2 is to detect a cycle of a Hall signal in the process of accelerating a motor and to detect the rotation direction when the cycle matches a cycle corresponding to a speed that is half of a rated rotation. It should be noted that the items that are the same as in Embodiment 1 are given the same reference signs to simplify the explanation.

Figure 8:
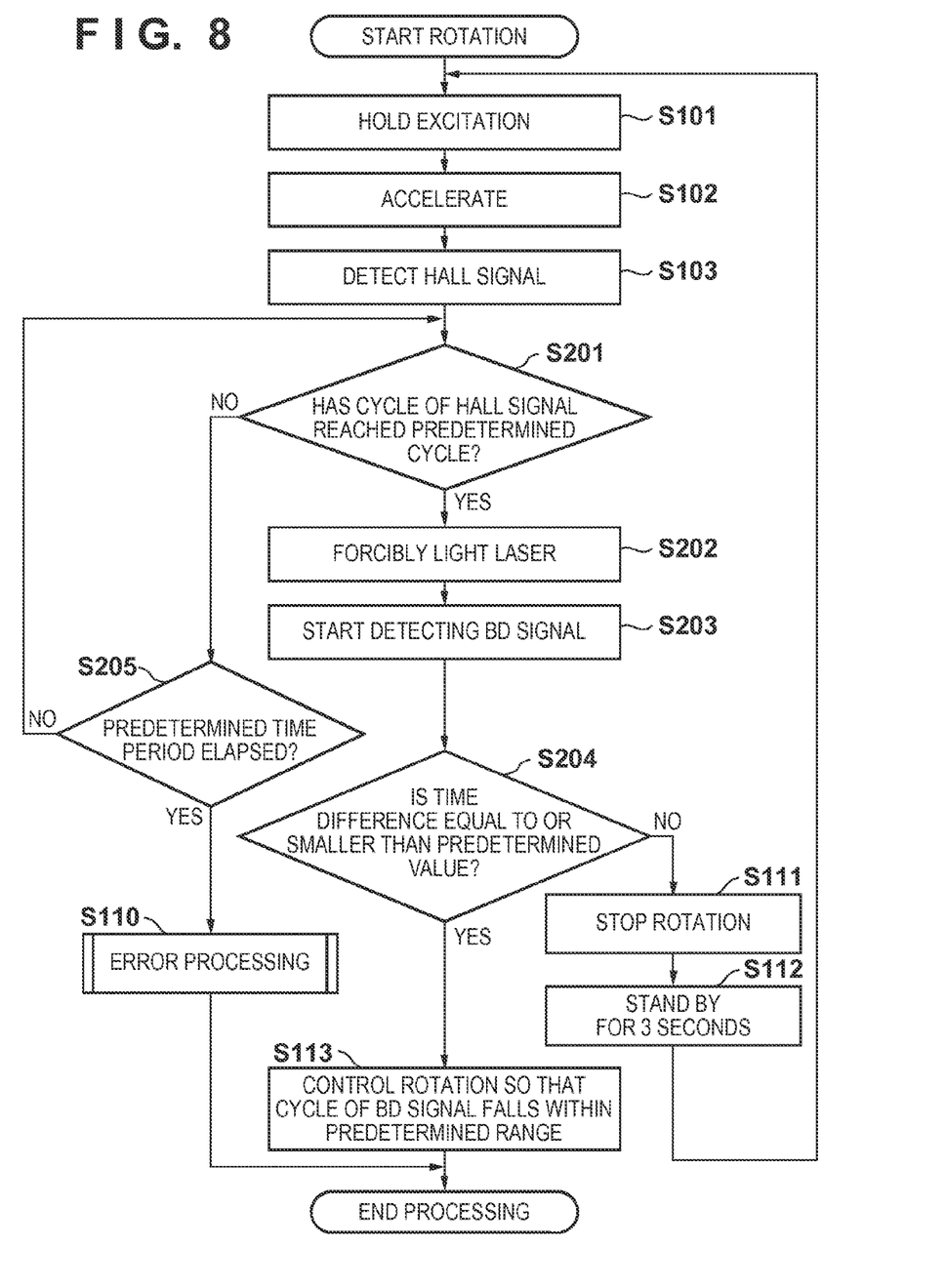
FIG. 8 is a flowchart of motor control processing according to Embodiment 2.

FIG. 8 is a flowchart of motor control according to Embodiment 2. After S101 to S103 are executed, the processing moves to S201.

In S201, the CPU 1 determines whether or not the cycle of the Hall signal has reached a predetermined cycle (e.g. 960 µs). As the rotation speed of the motor increases, the cycle of the Hall signal gradually shortens. That is to say, the rotation speed (rotation frequency) of the motor is inversely proportional to the cycle of the Hall signal. When the cycle of the Hall signal has reached or fallen below the predetermined cycle, the processing moves to S202. As such, the CPU 1 functions as a cycle determination circuit that monitors the cycle of the second detection signal and determines whether or not the cycle of the second detection signal has reached or fallen below a predetermined value. When the cycle determination circuit determines that the cycle of the second detection signal has reached or fallen below the predetermined value, the CPU 1 starts determining the rotation direction of the motor.

In S202, the CPU 1 forcibly lights the semiconductor laser unit 31.

In S203, the CPU 1 starts detecting a BD signal output from the signal detection sensor 310 via the drive control IC 101.

In S204, the CPU 1 determines whether or not a time difference between the falling of the BD signal and the rising of the Hall signal is equal to or smaller than a predetermined value (e.g. 120 µs). When the time difference is not equal to or smaller than the predetermined value, there is a high possibility that the motor is undergoing a reverse rotation and therefore the processing moves to S111. On the other hand, when the time difference is equal to or smaller than the predetermine value, the processing moves to S113.

When the CPU 1 determines that the cycle of the Hall signal has not reached the predetermined cycle (e.g. 960 µs) in S201, the processing moves to S205.

In S205, the CPU 1 determines whether or not a predetermined time period has elapsed since the detection of the Hall signal was started. When the predetermined time period has not elapsed, the processing returns to S201. On the other hand, when the predetermined time period has elapsed, it means that some sort of error has occurred, and therefore the processing moves to S110.

As has been described above, in Embodiment 2, the CPU 1 detects the rotation direction of the motor when the rotation frequency of the motor has reached a predetermined rotation frequency (e.g. half of a target rotation frequency). Therefore, Embodiment 2 can detect the rotation direction of the motor sooner than the invention whereby the rotation direction is detected after the rotation frequency of the motor has reached a target rotation frequency. In other words, Embodiment 2 can further shorten the duration of reverse rotation.

Embodiment 3

Figure 9:
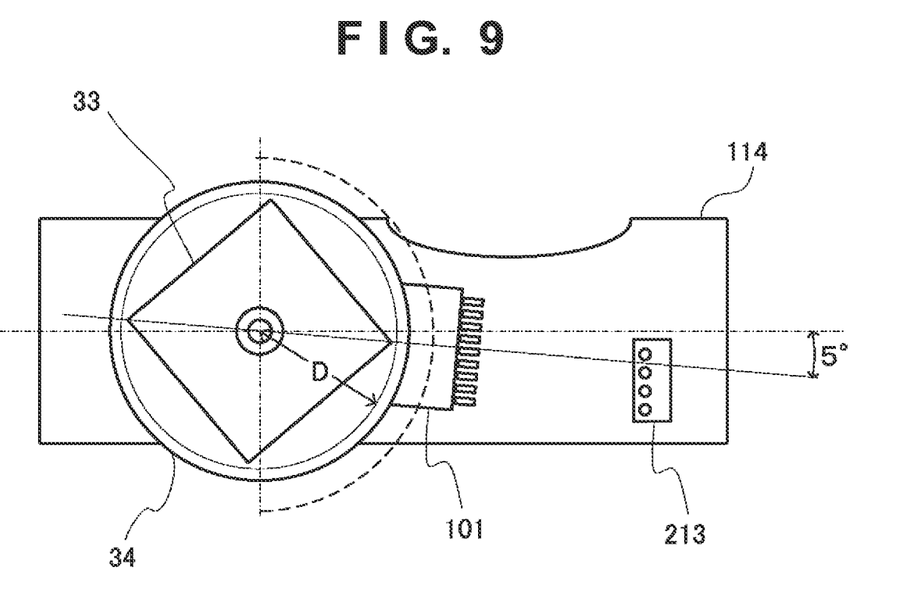
FIG. 9 is a layout diagram showing a motor control device on a printed circuit board according to Embodiment 3.

The following describes Embodiment 3 in detail with reference to an external view of FIG. 9. It should be noted that the matters that are the same as in Embodiments 1 and 2 are given the same reference signs to simplify the explanation.

As apparent from comparison between FIG. 5A and FIG. 9, a part of the printed circuit board 114 is removed in Embodiment 3 due to the arrangement of the deflection scanning device 34. In some cases, this removal is necessary to, for example, create a space for arranging an optical component such as a lens through which a light beam deflected by the rotating polygonal mirror 33 passes. When the printed circuit board 114 has this shape, it is necessary to arrange the drive control IC 101 obliquely with respect to the lengthwise direction of the printed circuit board 114 because of restrictions imposed by copper foil patterns on the drive control IC 101. Note that the oblique arrangement of the drive control IC 101 means that a main edge of the printed circuit board 114 and a corresponding edge of the drive control IC 101 are neither parallel nor perpendicular to each other. Therefore, the oblique arrangement of the drive control IC 101 does not mean that flat surfaces of the printed circuit board 114 and the drive control IC 101 are inclined.

In FIG. 9, the drive control IC 101 is arranged on the printed circuit board 114 so that the widthwise direction of the drive control IC 101 is oblique with respect to the lengthwise direction of the printed circuit board 114 by 5°. The drive control IC 101 is moved along the circumferential direction of the rotating polygonal mirror 33 so that a distance from the center of the rotation shaft of the rotating polygonal mirror 33 to the center of the drive control IC 101 is maintained at a fixed predetermined distance. More specifically, a distance from the center of the rotation shaft of the motor to the center of the magnetic detector element 5 is maintained at a fixed distance D. As a result, the positional relationship between the magnetic detector element 5 and the motor shown in FIG. 3 is maintained, and therefore the processing according to Embodiments 1 and 2 described above can be applied as-is.

As has been described above, when it is necessary to arrange the drive control IC 101 obliquely with respect to the printed circuit board 114, the drive control IC 101 is moved along the circumferential direction of the rotating polygonal mirror 33 so that a distance from the center of the rotation shaft of the rotating polygonal mirror 33 to the center of the drive control IC 101 is maintained at a predetermined distance. More specifically, a distance from the center of the rotation shaft of the motor to the center of the magnetic detector element 5 is maintained at a fixed distance D. Accordingly, the processing according to Embodiments 1 and 2 described above can be applied as-is. Furthermore, when the drive control IC 101 is arranged obliquely, a vacant space can be secured on the printed circuit board 114. By arranging an optical component in the vacant space, the optical scanning device can be downsized as a whole.

Other Embodiments

Embodiments 1 to 3 have discussed the case where the present invention is applied to an optical scanning device mounted in an image forming device. However, the present invention is not limited to being applied to a printer, but can also be applied to any device with an image forming function, such as a copier, a facsimile machine and a multifunction peripheral.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-231094, filed Oct. 20, 2011, and No. 2012-171496, filed Aug. 1, 2012, which are hereby incorporated by reference herein in their entirety.

The invention claimed is:

1. A motor control device comprising:
   a motor configured to rotate a mirror for deflecting light emitted from a light source;
   a first detector element configured to detect the light deflected by the mirror and to output a first detection signal;
   a second detector element configured to output a second detection signal by the motor rotating; and
   a rotation direction determination unit configured to determine a rotation direction of the motor in a state of the motor rotating at a speed lower than a target speed, wherein the rotation direction determination unit determines that the motor is undergoing a forward rotation when a time difference between an output timing of the first detection signal and an output timing of the second detection signal falls within a predetermined range, and determines that the motor is undergoing a reverse rotation when the time difference does not fall within the predetermined range.

2. The motor control device according to claim 1, further comprising
   a cycle determination unit configured to monitor a cycle of the first detection signal and to determine whether or not the cycle of the first detection signal falls within a predetermined range,
   wherein the rotation direction determination unit is configured to start determining a rotation direction of the motor when the cycle determination unit determines that the cycle of the first detection signal falls within the predetermined range.

3. The motor control device according to claim 1, further comprising
   a cycle determination unit configured to monitor a cycle of the second detection signal and determines whether or not the cycle of the second detection signal has reached or fallen below a predetermined value,
   wherein the rotation direction determination unit is configured to start determining a rotation direction of the motor when the cycle determination unit determines that the cycle of the second detection signal has reached or fallen below the predetermined value.

4. The motor control device according to claim 1, further comprising
   a motor drive circuit configured to drive the motor,
   wherein the second detector element and the motor drive circuit are arranged in the same semiconductor integrated unit.

5. The motor control device according to claim 4, further comprising
   a printed circuit board on which the semiconductor integrated unit and the motor are mounted,
   wherein the semiconductor integrated unit is mounted obliquely with respect to the printed circuit board so that a distance from a center of a rotation shaft of the motor to the second detector element arranged in the semiconductor integrated unit is maintained at a predetermined distance.

6. The motor control device according to claim 4, wherein the semiconductor integrated unit includes:
   a semiconductor chip including the second detector element and the motor drive circuit;
   a group of output pins arranged on one side of the semiconductor chip; and
   a group of input pins arranged on the other side of the semiconductor chip, and
   wherein the second detector element and a part of the motor drive circuit are arranged in one of two areas obtained by dividing the semiconductor chip by a line that is parallel to an edge along which the group of output pins are arranged and to an edge along which the group of input pins are arranged out of four edges of the semiconductor integrated unit and that passes through a center of the semiconductor chip.

7. An optical scanning device comprising:
   a light source;
   a mirror configured to deflect light emitted from the light source;
   a motor configured to rotate the mirror;
   a first detector element configured to detect the light deflected by the mirror and to output a first detection signal;
   a second detector element configured to output a second detection signal by the motor rotating; and
   a rotation direction determination unit configured to determine a rotation direction of the motor in a state of the motor rotating at a speed lower than a target speed, wherein the rotation direction determination unit determines that the motor is undergoing a forward rotation when a time difference between an output timing of the first detection signal and an output timing of the second detection signal falls within a predetermined range, and determines that the motor is undergoing a reverse rotation when the time difference does not fall within the predetermined range.

8. An image forming device comprising:
   an image carrier; and
   an optical scanning device configured to form a latent image by irradiating the image carrier with light,
   wherein the optical scanning device includes:
   a light source;
   a mirror configured to deflect light output from the light source;
   a motor configured to rotate the mirror;

a first detector element configured to detect the light deflected by the mirror and to output a first detection signal;

a second detector element configured to output a second detection signal by the motor rotating; and a rotation direction determination unit configured to determine a rotation direction of the motor in a state of the motor rotating at a speed lower than a target speed, wherein the rotation direction determination unit determines that the motor is undergoing a forward rotation when a time difference between an output timing of the first detection signal and an output timing of the second detection signal falls within a predetermined range, and determines that the motor is undergoing a reverse rotation when the time difference does not fall within the predetermined range.

9. A printed circuit board comprising:

a motor of which a rotation axis thereof is fixed at the printed circuit board; and a semiconductor integrated unit including a detector element and a control unit to control the motor in accordance with a signal from the detector element, wherein the detector element is configured to detect a position of a rotor of the motor, and wherein the semiconductor integrated unit is mounted obliquely with respect to the printed circuit board so that a distance from a center of a rotation shaft of the motor to the detector element is maintained at a predetermined distance.

10. A printed circuit board on which a motor is mounted, comprising:

an integrated circuit (IC) including:

a detector element configured to detect information concerning to a rotational position of the motor; and a drive circuit configured to drive the motor based on a detection result of the detector element;

wherein the IC is mounted on the printed circuit board such that the detector element of the IC is located in a space between the motor and the printed circuit board.

11. The motor according to claim 1, wherein the second detector element is a sensor configured to detect a position of a rotor of the motor.

12. The motor according to claim 1, wherein the mirror includes a rotating polygonal mirror.

13. The optical scanning device according to claim 7, wherein the mirror includes a rotating polygonal mirror.

14. The image forming device according to claim 8, wherein the mirror includes a rotating polygonal mirror.

15. The printed circuit board according to claim 9, wherein the semiconductor integrated unit is arranged obliquely with respect to the lengthwise direction of the printed circuit board.

* * * * *